May 26, 1953  F. T. SMITH  2,639,456
HANDLE ASSEMBLY FOR VACUUM CLEANERS
Filed Oct. 24, 1947  3 Sheets-Sheet 1
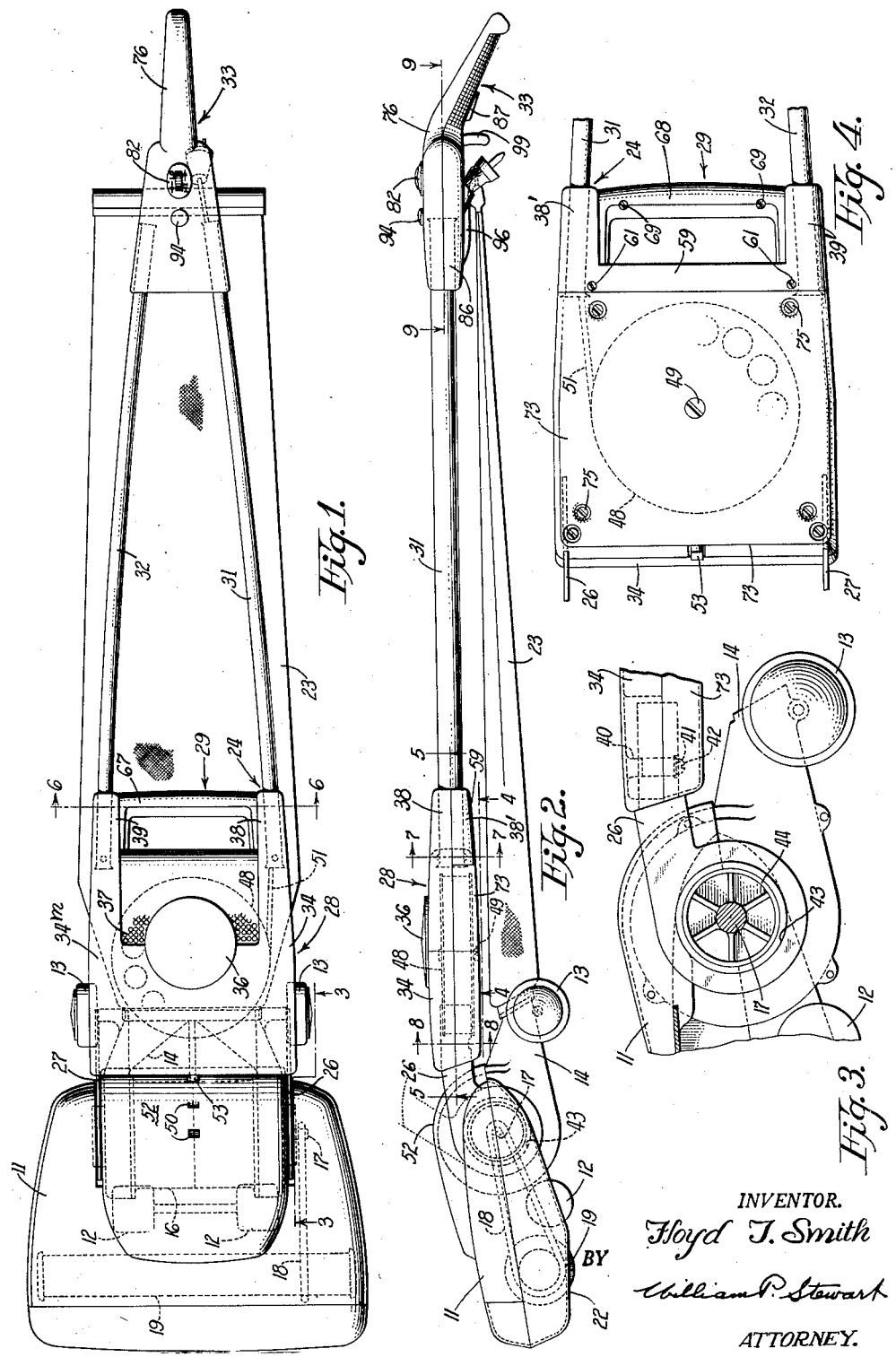
INVENTOR.
Floyd T. Smith
BY
William P. Stewart
ATTORNEY.

May 26, 1953      F. T. SMITH      2,639,456
HANDLE ASSEMBLY FOR VACUUM CLEANERS
Filed Oct. 24, 1947      3 Sheets-Sheet 2
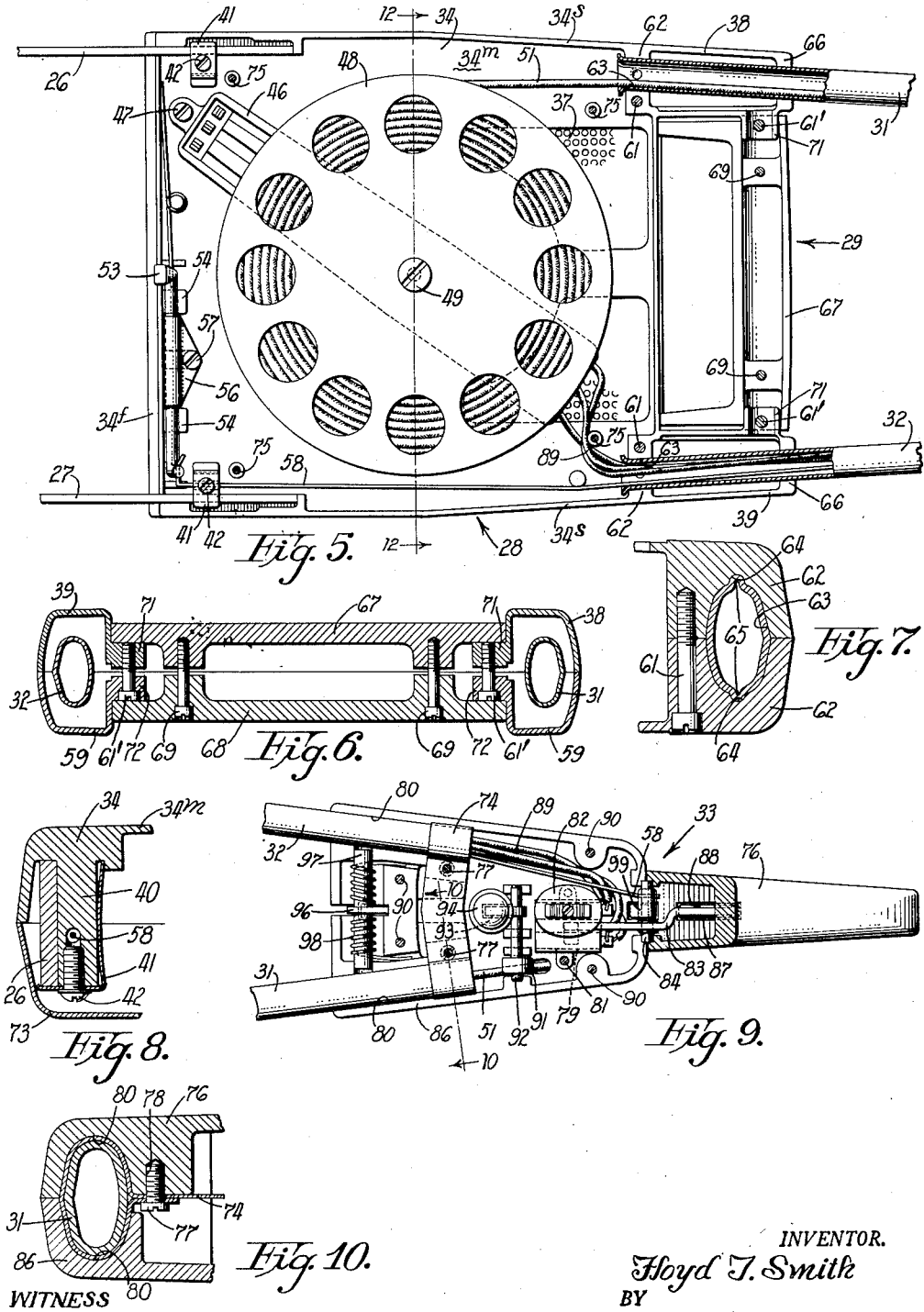
INVENTOR.
Floyd T. Smith
BY
William P. Stewart
ATTORNEY
WITNESS
N. Leszczak May 26, 1953 F. T. SMITH 2,639,456
HANDLE ASSEMBLY FOR VACUUM CLEANERS
Filed Oct. 24, 1947 3 Sheets-Sheet 3

INVENTOR.
Floyd T. Smith
BY
William P. Stewart
ATTORNEY.

WITNESS
N. Leszczak

Patented May 26, 1953

2,639,456

UNITED STATES PATENT OFFICE 2,639,456

HANDLE ASSEMBLY FOR VACUUM CLEANERS

Floyd T. Smith, Plainfield, N. J., assignor to The Singer Manufacturing Company, Elizabeth, N. J., a corporation of New Jersey Application October 24, 1947, Serial No. 781,836

12 Claims. (Cl. 15—257)

This invention relates to domestic vacuum cleaners and more particularly to vacuum cleaner handle assemblies designed to serve not only as a propelling and pick-up handle but also as a means for supporting a cord take-up reel.

A United States patent application, Serial No. 1,386 filed January 9, 1948, by Herbert S. Barnhart, now Patent 2,600,608 issued June 17, 1952, describes and broadly claims a combination propelling guiding, and pick-up handle for vacuum cleaners in which a pair of converging handle tubes have a cord-reel and a transversely extending pick-up handle located between their divergent terminals and in which a hand-grip is secured to the converging terminals of the tubes. The instant patent application has for one of its objects the provision of improved and advantageous means for assembling and joining together the various elements which form the vacuum cleaner handle set forth in the United States Patent 2,600,608, supra.

A further object of the invention is to provide an improved means for installing a transversely extending pick-up handle in a two-tube, vacuum cleaner handle assembly.

A still further object of the invention is to provide an improved means for housing a cord-reel in the handle of a vacuum cleaner.

Another object of the invention is to provide an improved hand-grip for a vacuum cleaner handle assembly.

With these and other objects in view, as will hereinafter appear, the invention consists in the devices, combinations and arrangements of parts hereinafter described in connection with the accompanying drawings, which illustrate a preferred embodiment of the invention and in which:

Fig. 1 is an external plan view of a floor type vacuum cleaner showing the improved handle of this invention lowered to a position substantially parallel to the floor;

Fig. 2 is a side elevational view of the vacuum cleaner shown in Fig. 1;

Fig. 3 is a fragmentary sectional view on the line 3—3 of Fig. 1;

Fig. 4 represents a bottom plan view of a portion of the handle assembly shown in Fig. 2 and as seen on the line 4—4;

Fig. 5 is a fragmentary sectional view of a portion of the vacuum cleaner handle assembly as seen substantially along the line 5—5 of Fig. 2;

Fig. 6 is a sectional view taken on the line 6—6 of Fig. 1 and looking in the direction of the arrows;

Fig. 7 is a fragmentary sectional view taken along the line 7—7 of Fig. 2;

Fig. 8 is a fragmentary sectional view taken along the line 8—8 of Fig. 2 and looking in the direction of the arrows;

Fig. 9 is a fragmentary sectional view of the hand-grip as taken substantially along the line 9—9 of Fig. 2;

Fig. 10 is a fragmentary sectional view taken on the line 10—10 of Fig. 9 as seen in the direction of the arrows;

Figure 11:
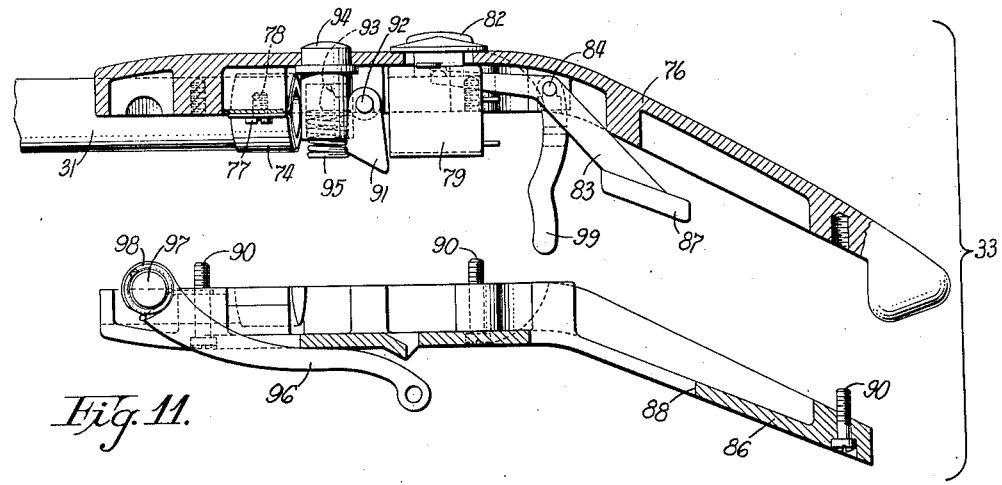
Fig. 11 is a partly exploded elevational sectional view of the hand-grip shown in Fig. 9.

The vacuum cleaner illustrated in the accompanying drawings includes an ambulatory chassis 11 supported on a pair of front wheels 12 attached to the chasis, and a pair of rear wheels 13 attached to exhaust outlets 14, which extend rearwardly from the main chassis 11. An electric motor, indicated generally by the number 16, has a shaft 17 which drives a pair of rotary fans (not shown) and a belt 18. The belt 18 drives a brush 19; the brush being rotatably mounted in a suction chamber having a downwardly open mouth 22 through which dirt enters the vacuum cleaner. The dirt, after passing through the vacuum cleaner chassis, is discharged through the outlets 14, from which it enters a dust bag 23; the lower end of the dust bag being detachably connected to the outlets 14.

A combined propelling and lifting-handle assembly, indicated generally as 24, is pivotally attached to the chassis 11 by a pair of spaced, flat metallic trunnion arms 26 and 27. The upper end of the dust bag 23 is supported from the rearward or upper end of this handle assembly by a means hereinafter described.

By reference to Fig. 1, it will be noted that the handle assembly is constructed from five principal portions; namely, a comparatively wide reel housing 28, a pick-up handle 29, a pair of longitudinally extending handle arms or tubes 31 and 32, and a hand-grip 33. The forward terminal of the tubes diverge and are connected to the combination reel housing 28 and pick-up handle 29, whereas, the rearward terminal of the tubes converge and are connected to the comparatively narrow, two-part hand-grip 33.

Figure 12:
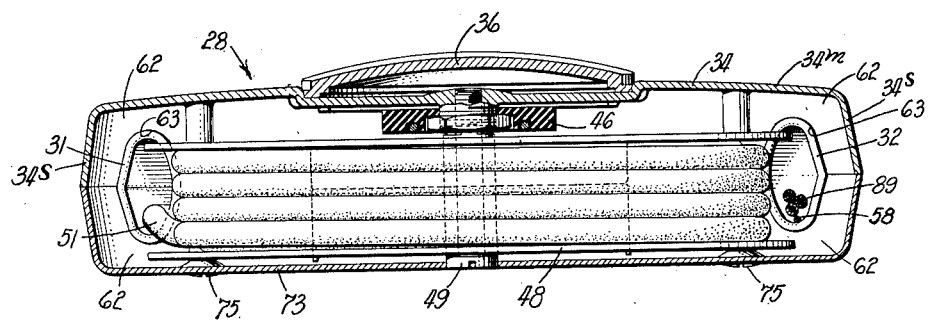
Fig. 12 is a sectional view taken on the line 12—12 of Fig. 5.

The combination reel housing 28 and pick-up handle 29 has as one of its principal units a half-portion or inverted box 34 or box-shaped portion having an open side (Figs. 5 and 12) to which many of the parts of the complete handle assembly are attached. This box comprises a main wall 34m, side walls 34s—34s and a forward wall 34f. The wall 34m of the box 34 has a centrally located medallion 36 secured to its outer face. A screen 37, which fits into a cut away portion of the wall 34m, is positioned between two spaced rearwardly extending legs 38 and 39; the legs being formed integral with the box 34.

The box 34 is provided with means by which it may be attached to or separated from the rearwardly extending, rectangular ends of the trunnion arms 26 and 27 (Figs. 5 and 8). This attaching means includes a pair of posts 40 that are formed integral with a forward part of the box 34. Each arm 26—27 passes through a slit in the wall 34f and is clamped to one side of one of the posts 40 by means of an L-shaped clip 41 which is held to the end of the post by a screw 42. One leg of each of the L-shaped clips is positioned at one side of the posts 40, whereas the other leg of each of the clips passes over the end of one of the posts 40 and contacts one side of one of the trunnion arms. The forward end of each of the trunnion arms 26—27 has a circular aperture 43 which is fitted with a bearing bushing and journaled on trunnions 44 formed as a part of the motor unit 16, thus causing the complete handle assembly 24 to be pivotally mounted with respect to the chassis 11. For a more complete description of this means for attaching the handle to the chassis, reference may be had to the application Serial No. 784,167, filed November 5, 1947, by E. P. Turner.

The box 34 also supports an electric-cord take-up reel 48 and an associated electrical connection block 46 (Fig. 5). The block 46 is held to the inside face of the wall 34m by screws, as for example, 47. This connection block 46 carries a plurality of electrical contacts (not shown) which cooperate with conventional slip rings (not shown) carried on the spring-biased cord-reel 48. The cord-reel 48 is rotatably carried on a journal-stud 49 which is screwed into a threaded hole in the wall 34m, and a two-conductor electric cord 51 is wound onto and pulled from the reel 48.

From Fig. 2 it will be seen that the lower or forward end of the reel housing 28 is mounted to swing in an arc which is close to and concentric with the upper surface 52 of the chassis 11. The chassis 11 has a plurality of notches 50 provided therein and the forward end of the upper half-portion 34 carries a downwardly projecting substantially U-shaped detent latch 53, one leg of which is designed to engage these notches. The latch 53 (Fig. 5) is pivotally held to a pair of journal bosses 54, formed integral with the inside of the wall 34m, by a journal cap 56 that is held in place by a screw 57. An operating wire 58 is hooked to one of the legs of the U-shaped latch 53, passes through an opening in one of the posts 40 and enters the lower end of the tube 32. The latch is operated by means of this wire from the hand-grip 33 in a manner later to be described.

The forward terminals of the handle tubes 31 and 32 are clamped (Figs. 4 and 7) to the half-portion or box 34 by a U-shaped clamp member 59 which is held in place by a pair of long screws 61 (Figs. 4 and 7) and by a pair of short screws 61' (Fig. 6). Both the half-portion 34 and the clamp-member 59 have bridge or saddle members 62 (Figs. 5 and 7) that are recessed as at 63 to exactly receive and thereby securely clamp the forward or divergent terminals of the tubes 31 and 32. Each of the recesses 63 is provided with a concavity 64 designed to receive a small positioning mound 65 appropriately formed on the handle tubes. Additional recessed bridges or saddles 66, formed as part of the legs 38—39 of the box 34 and legs 38'—39' of the clamp 59, are in alignment longitudinally of the handle with bridge or saddle portions 62 and are arranged to clamp the handle tubes a short distance to the rear of the forward terminals thereof.

The transversely extending pick-up handle 29 comprises two handle parts 67—68 (Fig. 6) which are held together by a pair of screws 69, and the two parts when thus held, clamp inwardly projecting bosses 71 and 72 formed respectively on the leg members 38—39 and the leg members 38'—39'. A substantially box-shaped bottom cover 73, which encloses the otherwise open bottom face of the half-portion 34 is held in place by screws 75 and thereby covers the reel 48, the connection block 46, the latch 53 and the clips 41.

As best seen in Fig. 1, the forward or divergent terminals of the handle tubes 31 and 32 are spaced a considerable distance apart and as these tubes extend rearwardly, they converge until the rear terminals, where they enter the hand-grip 33, are only about one-half as far apart as are the forward terminals where they enter the legs 38—39. The convergent terminals of the handle tubes 31 and 32 (Figs. 9, 10 and 11) are maintained converged by being positioned in complementary convergent recesses 80 appropriately formed in the upper-half 76 and the lower-half 86 of the hand-grip 33 and by a V-shaped strip-clamp 74. Opposite ends of the strap 74 encircle the rearward terminals of the handle tubes 31 and 32. The strap is held to the upper-half 76 of the two part hand-grip 33 by screws 77, that pass through one end and the standing-part of the strap 74 and enter a thread hole 78 in the upper-half 76. The upper-half 76 of the hand-grip 33 also supports an electric switch 79 which is held in place by a screw 81 (Figs. 9 and 11). The switch 79 has two operating mechanisms; one takes the form of a control element or thumb button 82 that is formed as part of the switch 79 and which is therefore supported from the upper-half 76. The other operating mechanism comprises a lever 83 pivotally mounted on a shaft 84 carried by the upper-half of the hand-grip 33. The thumb button 82 may assume three positions and thereby operates electrical contacts within the switch 79. If the button is moved all the way forward, the switch 79 is set to operate the motor at "low" speed. If the button is moved all the way to the rear, the switch 79 is set to operate the motor at "high" speed. And if the button is moved to a mid-position, the switch 79 is set to interrupt all flow of electric current to the motor. The lever 83 has a control element or finger pad 87 (Figs. 2 and 11) which projects downwardly through an opening 88 (Figs. 9 and 11) in a lower-half 86 of the hand-grip 33. This finger pad may be pressed by anyone grasping the hand-grip 33, and whenever the finger pad 87 is thus pressed, the lever 83 moves elements within the switch 79 in such a manner as to operate the motor 16 at a "high" or a "low" speed provided the thumb button 82 is set for this operation. The switch 79 is appropriately connected to the connection block 46, and thus to the cord-reel 48 and the motor 16, by a plurality of electrical conductors 89 which pass through the hollow handle-tube 32. The upper and lower halves of the hand-grip 33 are held together by a plurality of screws 90.

The hand-grip 33 also carries a cord gripping dog 91 that is secured to one end of a pivotally mounted shaft 92. The other end of the shaft 92 mounts an arm 93, the upper end of which is contacted by a push-button 94 which projects through a hole in the upper-half 76 of the hand-grip 33, and which is biased upwardly by a spring 95. When the electric cord 51 has been pulled out of the handle, the dog 91 grips and holds the cord in the extended position against the retrieving pull of the cable-reel 48. When the push-button 94 is pressed, the cable is released and the cable-reel 48 retrieves the cord 51.

The hand-grip 33 also carries a means for supporting the upper end of the dust bag 23. This means comprises a curved take-up arm 96 (Figs. 9 and 11) that is pivotally mounted on a pin 97 supported by the hand-grip 33. The take-up arm is biased to a position away from the cleaner by a coiled spring 98 that surrounds the pin 97 on both sides of the lever arm 96. When the handle 24 of the vacuum cleaner is lowered to the floor level (Fig. 2), the spring 98 moves the arm 96 to a position rearwardly of the pin 97 and substantially parallel to the handle of the cleaner, thereby maintaining the bag taut. When the handle 24 is raised, relative endwise movement between the handle 24 and the bag 23 swings the arm about the pivot 97 (against the action of the spring 98) to a position on the other side of the pin and again substantially parallel to the handle 24.

The latch operating wire 58, hereinbefore mentioned, extends from the latch 53 upwardly through the reel housing 28, through the tube 32 and thence into the hand-grip 33, where it is attached to a trigger 99 (Figs. 2 and 9) that is pivotally mounted in the upper-half of the hand-grip 33. The trigger 99 extends outwardly through the aperture 88 in the lower-half 86 of the hand-grip 33 and is thereby in position for easy engagement by the forefinger of a person operating the vacuum cleaner. A backward pull on the protruding end of the trigger 99 causes the latch 53 to disengage the notches 50 on the chassis 11 and thereby permits the handle to pivot freely on the trunnions carried in the chassis 11.

The operation of the vacuum cleaner is as follows:

If it is desired to use the vacuum cleaner to pick up dirt from a floor and floor covering, the chassis 11 is placed on the floor, the end of the extension cord 51 is pulled from the hand-grip 33 and connected to a proper electrical wall-receptacle. In order to be able to pivot the handle assembly 24 about the trunnions 44 on the chassis 11, the operator pulls on the trigger 99. This releases the detent latch 53 from engagement with the notches 50 and allows the handle to be moved to the proper operating position. The operator then moves the button 79 to the "high" or "low" speed position and grasps the end of the hand-grip 33. This latter operation depresses the finger pad 87 and closes a circuit in the switch 79 to start the motor 16. If for any reason the operator has pulled out more cord than is required, he can permit the cord-reel 48 to retrieve the excess cord by pressing on the cord-control button 94.

When it becomes desirable to move the cleaner from one room to another, the operator moves the handle assembly 24 to the vertical position at which point the latch enters one of the notches 50, thus locking the handle and the chassis together. Then the operator grips the horizontally extending pick-up handle 29 and lifts the cleaner from the floor. Since the pick-up handle 29 is in line with the center of gravity of the cleaner, the operator finds that it is very easy to balance the cleaner when carrying it from place to place.

If for any reason, as for example, for storage purposes, it is desirable to separate the handle assembly 24 from the chassis 11, this can be done by loosening the two screws 42. This releases the spring clip 41 and allows the reel housing 28 to be separated from the trunnion arms 26.

In the event that one or both of the handle tubes 31—32 should become bent or otherwise damaged, they can be removed or replaced in the following manner. First the bottom cover 73 is removed from the reel housing 28 by the removal of screws 75. Then the two half-portions 76 and 86 of the hand-grip 33 are separated by removing the screws 90. This makes it possible to remove the electric wires 89, the electric cord 51 and the operating wire 58. Then the upper-half 76 of the hand-grip 33 is removed from the rearward terminals of the tubes 31—32 by removal of the two screws 77. Thereafter the forward ends of the handle tubes 31—32 can be freed from attachment to the box 34 by first removing the bolts 69 (Fig. 6). This allows the two pick-up handle parts 67—68 to be removed from the bosses 71—72 and thereby exposes the short screws 61'. Removal of the screws 61 and 61' provides for a complete removal of the U-shaped clamp 59 and at the same time frees the tubes 31—32 from engagement with the box 34.

Having thus set forth the nature of the invention, what I claim herein is:

1. In a vacuum cleaner handle assembly, a pair of converging handle tubes having a cord-reel housing secured to and a transversely extending pick-up handle secured between the divergent ends of the tubes and having a hand-grip secured to the convergent ends thereof, the said hand-grip comprising a first half having a pair of spaced converging recesses so constructed and arranged as to accommodate the convergent ends of said handle tubes, a second half having a pair of spaced recesses that are complementary to said recesses in said first half, and a strap of which the opposite ends are wrapped around the ends of said handle tubes and thence secured to said first half.

2. In a vacuum cleaner handle assembly, a pair of converging handle tubes having a cord-reel housing secured to and a transversely extending pick-up handle secured between the divergent ends of the tubes and having a hand-grip secured to the convergent ends thereof, the said hand-grip comprising a first half having an opening passing therethrough, a second half having an opening passing therethrough, and an electric switch secured to said first half; said switch having a thumb button that passes through the opening in said first half and said switch having a lever which passes through the opening in said second half.

3. In a vacuum cleaner assembly, a pair of converging handle tubes having a hand-grip secured to the convergent ends thereof; the said hand-grip comprising a first half having a pair of spaced converging recesses so constructed and arranged as to accommodate the convergent ends of said handle tubes, and a second half having a pair of spaced recesses that are complementary to said recesses in said first half; a clamp member, opposite portions of which grip the convergent terminals of said handle tubes; and means for securing said clamp member to at least one of the halves of said hand-grip.

4. In a vacuum cleaner handle assembly, a pair of converging handle tubes having a cord-reel housing and a pick-up handle adjacent the divergent terminals of said tubes and having a hand-grip adjacent the convergent terminals thereof; means for securing said cord-reel housing to said tubes comprising a pair of leg members formed as a part of said cord-reel housing and a clamp having a pair of leg members complemental to said leg members on said cord-reel housing, the said leg members being arranged to embrace the divergent terminals of said handle tubes; the said hand-grip comprising a first half-portion and a second half-portion embracing the convergent terminals of said handle tubes, and a clamp member enclosed in said hand-grip, said clamp member also embracing the convergent terminals of said handle tubes, and thereby securely holding said tubes in said hand-grip.

5. In a vacuum cleaner assembly, a pair of spaced converging handle tubes having a cord-reel housing secured to and a transversely extending pick-up handle secured between the divergent end of said tubes, and having a hand-grip secured to the convergent ends thereof; the said hand-grip comprising a first half-portion formed with a pair of converging recesses arranged to receive one-half of each of said handle tubes; a second half-portion formed with a pair of converging recesses arranged to receive the other half of each of said handle tubes; a clamp member, opposite portions of which engage the convergent terminals of said spaced handle tubes and said clamp member being so constructed and arranged that parts of said clamp are located between said first half-portion of said hand-grip and each of said tubes, and whereby other parts of said clamp are located between said second half-portion of said hand-grip and each of said tubes.

6. In a vacuum cleaner handle assembly, a pair of convergent handle tubes having a cord-reel housing and a transversely extending pick-up handle secured between the divergent ends of the tubes and having a hand-grip secured to the convergent ends thereof, said cord-reel housing comprising, a hollow casing having an open side and having a pair of spaced leg members extending in the direction of convergence of the handle tubes, a pair of first saddle members formed as a part of said hollow casing, a second saddle member formed as part of each of said leg members, each second saddle member being aligned with one of said first saddle members, and a U-shaped clamp arranged to hold the divergent ends of said handle tubes to said saddle members.

7. In a vacuum cleaner handle assembly, a pair of convergent handle tubes having a cord-reel housing secured to and a transversely extending pick-up handle secured between the divergent ends of the tubes and having a hand-grip secured to the convergent ends thereof, said cord-reel housing comprising a box having an open side and having a pair of spaced leg members extending in the direction of convergence of the handle tubes, a U-shaped clamp secured to said box adjacent said leg members, and a pair of inwardly projecting bosses formed as part of said leg members and as part of said clamp, said transversely extending pick-up handle being clamped to said bosses.

8. In a vacuum cleaner handle assembly, a pair of convergent handle tubes having a cord-reel housing secured to and a transversely extending pick-up handle secured between the divergent ends of the tubes and having a hand-grip secured to the convergent ends thereof, said cord-reel housing and pick-up handle comprising a box having an open side and having a pair of spaced leg members extending in the direction of convergence of the handle tubes, a U-shaped clamp member secured to said box, a two-part pick-up handle secured to said box and said clamp member, a cover secured to said box portion to cover the open side thereof, and a cord-reel rotatably mounted within said cord-reel housing.

9. In a vacuum cleaner handle assembly, a pair of handle tubes having a cord-reel housing located between one pair of ends thereof, said cord-reel housing comprising a box having an open side, a cord-reel rotatably mounted in said box, a pair of leg members formed integral with said box and extending outwardly in the same general direction therefrom, a clamp secured to said box, a pair of leg members formed integral with said clamp, said latter pair of leg members being formed complemental to said former pair of legs, said pair of handle tubes extending in the same direction as said leg members and clamped therebetween, and a cover for said box.

10. In a vacuum cleaner handle assembly, a pair of handle tubes having a cord-reel housing located between the ends thereof, the said cord-reel housing comprising a box having an open side, a cord-reel rotatably mounted in said box, a pair of legs formed integral with said box, a pair of first saddles formed integral with said box and said legs, a clamp secured to said box, a pair of legs formed integral with said clamp, a pair of second saddles formed integral with said legs on said clamp and aligned with said first saddles, said latter pair of legs being formed complemental to said former pair of legs, and said pair of handle tubes extending from said leg members and clamped between said saddles, and a cover for the open side of said box.

11. In a vacuum cleaner handle assembly, a pair of handle tubes having a cord-reel housing and a transversely extending pick-up handle located between the ends thereof, the said cord-reel housing and pick-up handle comprising a box having an open side, a cord-reel rotatably mounted in said box, a pair of legs formed integral with said box and extending in the same direction as said handle tubes, a clamp secured to said box, a pair of legs formed integral with said clamp, said latter pair of legs being formed complemental to said former pair of legs, and the said pair of handle tubes being clamped between said leg members, a plurality of inwardly projecting bosses formed integral with said legs, and a two-piece handle extending between and clamped to said bosses.

12. In a vacuum cleaner handle assembly, a pair of converging handle tubes having a cord-reel housing located between the divergent terminals of the tubes and having a hand-grip secured to the convergent terminals thereof; the said cord-reel housing comprising a box having an open side, a plurality of saddle members formed as a part of said box; a U-shaped clamp arranged to hold the divergent terminals of said handle tubes to said saddle members; the said hand-grip comprising a first half-portion formed with a pair of converging recesses arranged to receive one-half of each of the convergent terminals of the handle tubes, a second half-portion formed with a pair of converging recesses arranged to receive the other half of each of the convergent terminals of said handle tubes, and means for holding said two half-portions together.

FLOYD T. SMITH.

References Cited in the file of this patent

UNITED STATES PATENTS

| Number | Name | Date |
|---|---|---|
| D. 132,319 | Taylor | May 5, 1942 |
| 91,145 | McGaffey | June 8, 1869 |
| 1,102,000 | Clements | June 30, 1914 |
| 1,897,087 | Tamarin | Feb. 14, 1933 |
| 1,921,288 | Farmer | Aug. 8, 1933 |
| 1,923,689 | Rosenberg | Aug. 22, 1933 |
| 2,085,042 | Replogle | June 29, 1937 |
| 2,342,912 | White | Feb. 29, 1944 |
| 2,370,907 | Lewis | Mar. 6, 1945 |

FOREIGN PATENTS

| Number | Country | Date |
|---|---|---|
| 697,720 | France | Nov. 4, 1930 |